Patented May 6, 1930

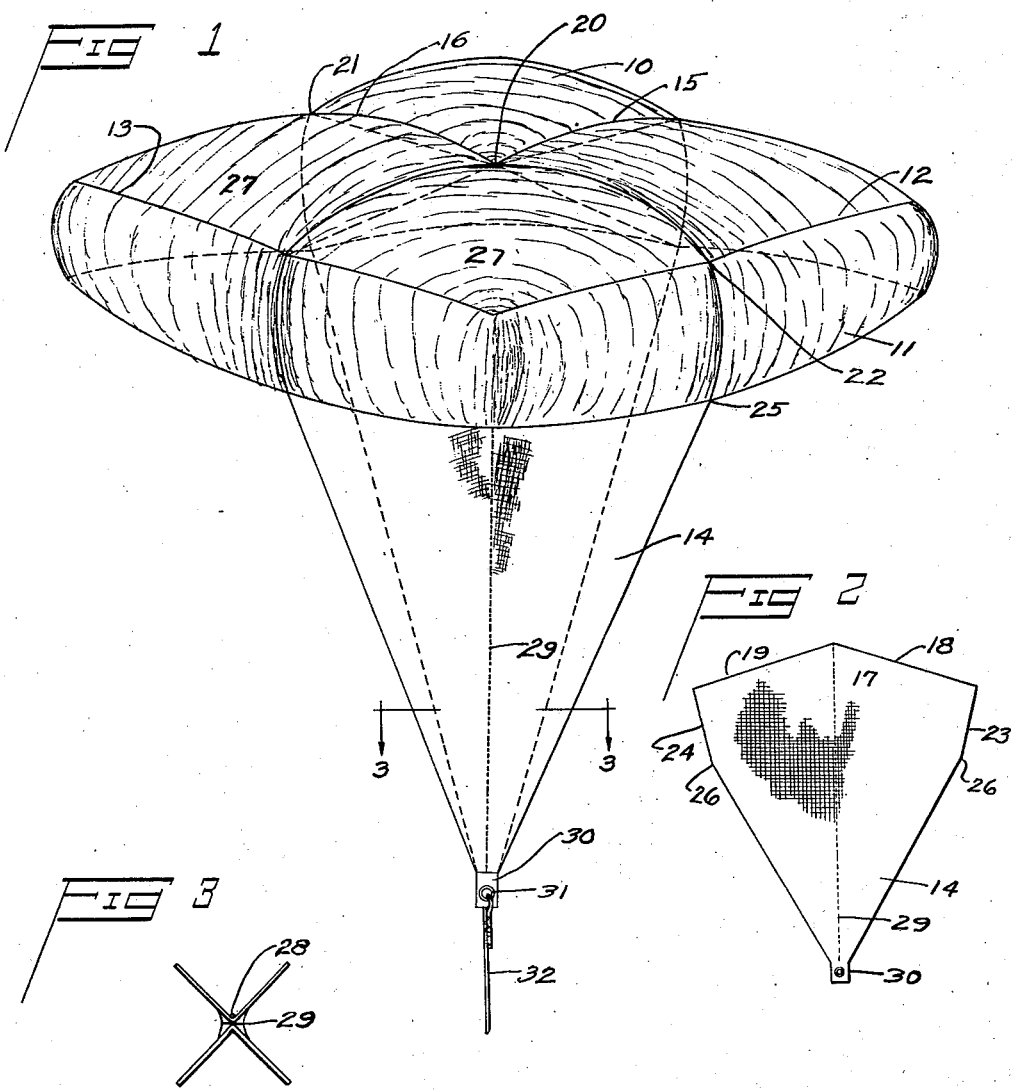

1,757,247

UNITED STATES PATENT OFFICE

EDWARD L. HOFFMAN, OF DAYTON, OHIO

PARACHUTE

Application filed August 28, 1929. Serial No. 389,056.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

The present invention relates generally to improvements in parachutes and more particularly wherein the improvements are directed toward providing a parachute which is positive in the operation of opening regardless of the condition or manner in which it may be presented to an air stream.

This invention has for its main object the provision of a parachute of the class described, having an improved system of suspension of the supporting canopy whereby the usual suspension lines are replaced by the use of a plurality of V-shaped panels of fabric arranged at an angle to one another.

The invention is further characterized by the provision of a parachute, the supporting canopy of which is substantially square in shape and of box-like construction.

Another object of the invention is the provision of a parachute constructed entirely of fabric sections and one which is simple in construction, light in weight, and effective and dependable in action. It is particularly an object of this invention to provide means for causing the straightening out and opening of the parachute under all conditions, including certain conditions under which the present day type of parachute is totally inoperative or deficient in operation.

The present invention is applicable to a parachute construction for lowering persons from aircraft, as well as for lowering a dead load, such as a mail bag or parcel from an aircraft to the ground, as it enables the load to be launched into the air from any desired altitude without undue fear as to the possibility of the parachute not opening.

The invention is also applicable to its being used for carrying smoke cartridges, light or signal flares which may be connected to the bottom of the parachute and ignited to produce a smoke screen or to illuminate the ground or to give a signal as the case may be.

A parachute constructed in accordance with the present invention is particularly useful as concerns its application as an auxiliary or pilot parachute, adapted to be secured to the main sustaining canopy of parachutes of present day type.

In conventional parachutes of present day construction, the operation of the main sustaining canopy is insured by the use of a small automatically operated parachute which is used as a means for relatively anchoring or holding the upper end of the main parachute to extend the main canopy and thus cause it to open promptly. Pilot parachutes of the above described type are usually provided with a ribbed framework which is resiliently operated so as to automatically open when released. The use of a ribbed framework to open the pilot parachute has definitely been established as being directly responsible for the failure of the main sustaining canopy to open, for the reason that the ribs of the framework are apt to catch and hold the suspension lines of the sustaining parachute.

Furthermore the use of cordage for suspension members of the pilot parachute increases the hazard of fouling of either or both the pilot or main sustaining parachutes by entangling themselves about one or the other when the pilot parachute is released.

Any number of fabric panels or diaphragms may be used as suspension members in the construction of the parachute and as a consequence, the number of pockets in the canopy and the shape of the canopy may be somewhat modified. The present parachute when used as a pilot parachute may be designed in such proportions that the inflation of any one pocket will be sufficient to create drag enough to withdraw the main parachute from its container.

It will be apparent from the above named objects that the general purpose of the parachute of my invention is the achievement of a high degree of safety in apparatus of the class described. My invention possesses other objects and advantages, some of which, with the foregoing, will be set forth in the following detailed description. It is to be understood that I do not limit myself to the showing made by the said description, as I may adopt variant forms of my invention within the scope of the claims. In the drawings:

Fig. 1 is a view in perspective showing the parachute in an inflated condition.

Fig. 2 is a side plan view of one of the fabric panels used as a suspension element, and Fig. 3 is a sectional view taken on the line 3—3 of Fig. 1, showing the manner in which the panels are attached together.

Referring more particularly to the drawings in which corresponding numerals designate like parts in the various figures, the parachute in the embodiment of the invention herein illustrated comprises an upper canopy or supporting surface 10 and an outer rim portion 11. The canopy 10 is preferably formed of a single piece of fabric, substantially square in shape, as shown in Fig. 1, the canopy and outer rim portion being attached together by means of seams along the peripheral edge of said supporting surface as indicated by numerals 12 and 13.

A plurality of V-shaped fabric panels or diaphragms 14 form the suspension members of the parachute. These diaphragms may be of any desirable number, in the present instance and for the purpose of illustration two diaphragms being shown which are attached to the supporting surface of the parachute at right angles to one another and to the rim portion by means of seams along the lines 15 and 16. Each diaphragm is formed with a top portion 17 which is cut in the manner shown in Fig. 2 and comprises angularly diverging sides 18 and 19 of such length as to extend from the middle point 20 of the sustaining surface to adjacent sides of the rim portion 11 as shown at points 21 and 22, these points being located approximately equal distances from the corners of the fabric of the sustaining surface. The upper side portions of the diaphragms are provided with downwardly and inwardly extending edges as shown at 23 and 24, which are sewed to the rim portion and a fullness is provided in the corners of the supporting surface by attaching the points 25 of the rim portion to the points 26 of the diaphragm. Scoops or pockets 27 are thus provided by means of the fullness of the edges of the supporting surface which readily catch the air when the parachute is exposed to an air stream. The diaphragms when thus sewed or attached to the sustaining surface of the canopy are folded in the manner shown in Fig. 3 and designated by numeral 28, and are sewed together along lines 29, thus forming a construction, the cross section of which is fully illustrated by reference to Fig. 3 of the drawing. Tapes may be provided at the points of attachment of each diaphragm as shown at 29 to provide a reinforcement of the diaphragm to prevent tearing.

The lower ends of the diaphragm terminate in a tail portion 30 which is provided with a grommet 31 for receiving a snubbing line 32 therein, which, in turn, is fastened to the main parachute at its other end (not shown) for the purpose hereinbefore mentioned.

While I have illustrated the preferred form of construction for carrying my invention into effect, it is to be understood that variations and modifications may be made without departing from the spirit of my invention.

I, therefore, do not wish to be limited to the precise details of construction set forth but desire to avail myself of such variations and modifications as come within the scope of the appended claims.

Claims:

1. A parachute comprising a sustaining canopy and suspension element therefor, said suspension element consisting entirely of fabric panels, the entire upper edge of each panel being attached directly to said sustaining canopy.

2. A parachute comprising a canopy and suspension elements therefor, said suspension elements consisting entirely of a plurality of fabric panels attached directly to said canopy and to each other respectively.

3. In a parachute a canopy comprising an upper supporting surface which is generally flat and an outer rim portion extending downwardly and inwardly therefrom and suspension elements formed entirely of fabric panels attached to said canopy and extending downwardly to support a load at their lower ends, said suspension elements being so shaped as to form a plurality of scoops with said canopy.

4. A parachute comprising a canopy having a plurality of air scoops in the supporting surface thereof and suspension elements formed entirely of a plurality of fabric diaphragms attached directly to said canopy adapted to support a load, said diaphragms being positioned in planes passing through the center of area of said canopy and the center of load.

5. A parachute comprising a canopy having a plurality of divided air scoops in the supporting surface thereof and a plurality of load suspension elements consisting entirely of fabric panels, each of said elements being attached directly to said canopy at adjacent sides and extending inwardly and passing through the center of area of said canopy.

6. In a parachute, a canopy comprising a supporting surface which is substantially flat and having upper and lower peripheral edges, and suspension elements formed of a plurality of fabric panels attached to said canopy, the upper edge of said panels lying above the plane of the lower peripheral edge of said supporting surface.

In testimony whereof I affix my signature.

EDWARD L. HOFFMAN.

DISCLAIMER 1,757,247.—*Edward L. Hoffman*, Dayton, Ohio. PARACHUTE. Patent dated May 6, 1930. Disclaimer filed June 22, 1931, by the patentee.

Hereby enters this disclaimer to that part of the claims in said specification which are in the following words, to-wit:

"1. A parachute comprising a sustaining canopy and suspension element therefor, said suspension element consisting entirely of fabric panels, the entire upper edge of each panel being attached directly to said sustaining canopy.

"2. A parachute comprising a canopy and suspension elements therefor, said suspension elements consisting entirely of a plurality of fabric panels attached directly to said canopy and to each other respectively."

"4. A parachute comprising a canopy having a plurality of air scoops in the supporting surface thereof and suspension elements formed entirely of a plurality of fabric diaphragms attached directly to said canopy adapted to support a load, said diaphragms being positioned in planes passing through the center of area of said canopy and the center of load.

"5. A parachute compsising a canopy having a plurality of divided air scoops in the supporting surface thereof and a plurality of load suspension elements consisting entirely of fabric panels, each of said elements being attached directly to said canopy at adjacent sides and extending inwardly and passing through the center of area of said canopy."

[*Official Gazette July 7, 1931.*]